US012780114B2

(12) United States Patent
Wüllrich et al.

(10) Patent No.: US 12,780,114 B2
(45) Date of Patent: Nov. 3, 2026

(54) ROOF ASSEMBLY, ROOF MODULE AND MOTOR VEHICLE COMPRISING A SET OF WEATHERSTRIPS

(71) Applicants: Webasto SE, Stockdorf (DE); Webasto Shanghai Ltd., Shanghai (CN)

(72) Inventors: Heinrich Wüllrich, Stockdorf (DE); Alexander Haimerl, Stockdorf (DE); Eric Lei, Shanghai (CN); Jerry Hu, Shanghai (CN); Xinying Wang, Shanghai (CN)

(73) Assignees: Webasto SE, Stockdorf (DE); Webasto Shanghai Ltd., Shanghai (CN)

(*) Notice: Subject to any disclaimer, the term of this patent is extended or adjusted under 35 U.S.C. 154(b) by 404 days.

(21) Appl. No.: 18/565,756

(22) PCT Filed: Jun. 14, 2021

(86) PCT No.: PCT/CN2021/099926

§ 371 (c)(1),
(2) Date: Nov. 30, 2023

(87) PCT Pub. No.: WO2022/261802

PCT Pub. Date: Dec. 22, 2022

(65) Prior Publication Data

US 2024/0253579 A1 Aug. 1, 2024

(51) Int. Cl.
*H04N 23/50* (2023.01)
*B60J 10/25* (2016.01)
(Continued)

(52) U.S. Cl.
CPC ............... *B60R 11/04* (2013.01); *B60J 10/25* (2016.02); *B60J 10/86* (2016.02); *B60R 2011/004* (2013.01)

(58) Field of Classification Search
CPC .... B60R 11/04; B60R 2011/004; B60J 10/25; B60J 10/86
See application file for complete search history.

(56) References Cited

U.S. PATENT DOCUMENTS 10,011,230 B1 7/2018 Brown
2011/0101719 A1 5/2011 James et al.
(Continued)

FOREIGN PATENT DOCUMENTS

CN 102639349 A 8/2012
CN 102822006 A 12/2012
(Continued)

OTHER PUBLICATIONS

Office Action issued in corresponding German Application No. 11 2021 007 817.8; dated Jan. 17, 2025; In German with English translation (6 pages). All references were cited in prior IDS.
(Continued)

*Primary Examiner* — Patrick E Demosky
(74) *Attorney, Agent, or Firm* — Fitch, Even, Tabin & Flannery, LLP

(57) ABSTRACT

A roof module for forming a vehicle roof of a motor vehicle, the roof module having a panel component whose outer surface at least partially forms the roof skin of the vehicle roof, and an opening in which at least one environmental sensor is disposed, the environmental sensor being configured to send and/or receive electromagnetic signals for
(Continued)

detecting the vehicle environment. The at least one environmental sensor is configured to be displaced between a retracted position and a deployed position, and a set of weatherstrips surrounding the opening and has at least one drain is configured to collect liquid entering through the opening at the at least one drain.

18 Claims, 4 Drawing Sheets

(51) Int. Cl.

| | |
|---|---|
| ***B60J 10/86*** | (2016.01) |
| ***B60R 11/04*** | (2006.01) |
| *B60R 11/00* | (2006.01) |

(56) References Cited

U.S. PATENT DOCUMENTS

2012/0228900 A1 9/2012 Maltaverne
2013/0016219 A1 1/2013 Hahner
2015/0274090 A1 * 10/2015 Buschmann ........... H04N 23/50 224/567
2018/0281868 A1 10/2018 Tulett
2019/0210436 A1 7/2019 Frederick
2020/0114836 A1 * 4/2020 Day ....................... F16M 11/38

FOREIGN PATENT DOCUMENTS

CN 102834298 A 12/2012
CN 104736394 A 6/2015
CN 105501120 A * 4/2016 ............... B60R 1/00
CN 108657286 A 10/2018
CN 110435553 A 11/2019
CN 212098677 U 12/2020
CN 112929525 A 6/2021
GB 2642228 A * 1/2026 ............. B60R 11/04
WO 2021021516 A1 2/2021

OTHER PUBLICATIONS

ISR issued against corresponding PCT/CN2021/099926; mailed Mar. 9, 2022; In English (2 pages).
Office Action issued in parallel Chinese Application No. 102025125113.4; date mailed: Jun. 23, 2026; in Chinese with English machine translation (14 pages) Some references cited in office action cited by Applicant in previous IDS or by Examiner.

* cited by examiner

ROOF ASSEMBLY, ROOF MODULE AND MOTOR VEHICLE COMPRISING A SET OF WEATHERSTRIPS

CROSS-REFERENCE TO RELATED APPLICATIONS

This application is a U.S. national phase application filed under 35 U.S.C. § 371 of International Application No. PCT/CN2021/099926, filed on Jun. 14, 2021, published under WO 2022/261802A1 on Dec. 22, 2022, designating the United States, which is hereby incorporated herein by reference in its entirety.

FIELD

The invention relates to a roof module according to the preamble of claim 1 and to a motor vehicle having such a roof module.

BACKGROUND

Roof modules of this kind are widely used in vehicle manufacturing. For instance, roof modules are prefabricated as separate functional modules and are connected to a roof frame structure (which is part of the body structure) at the assembly line. The outer surface of the roof module at least partially forms a roof skin of the vehicle roof, the roof skin preventing humidity or air flow from entering the vehicle interior. The roof skin is formed by one or more panel components, which can be made of a stable material, such as painted sheet metal or painted or died plastic. The roof module can be part of a rigid vehicle roof or part of a modular roof that can be opened.

Furthermore, the development in vehicle manufacturing tends to focus more and more on autonomously or semi-autonomously driving motor vehicles. To enable the vehicle controller to control the motor vehicle autonomously or semi-autonomously, a number of environmental sensors (such as lidar sensors, radar sensors, (multi-)cameras, etc. including other (electrical) components are used which are integrated in the roof module, for example, and which detect the environment around the motor vehicle and determine, for example, a current traffic situation from the detected environmental data. Roof modules equipped with a plurality of environmental sensors are also known as roof sensor modules (RSM). The known environmental sensors send and receive corresponding electromagnetic signals, such as laser beams or radar beams, appropriate signal evaluation allowing a data model of the vehicle environment to be generated and used for controlling the vehicle. To protect the environmental sensors from harmful environmental conditions, such as humidity and air flow, the environmental sensors are typically installed in one or more housings that define a dry area of the roof module, which is sealed against humidity.

If the environmental sensor is to be deployable and retractable in order to satisfy aesthetic aspects, for example, and to additionally protect the environmental sensor from environmental conditions when it is in a non-active state, there is the issue that an entry of humidity into the roof module (and into the roof space of the vehicle), but especially into the dry area of the roof module has to be prevented at all times in order to ensure the functioning of the environmental sensor (or of a plurality of environmental sensors).

SUMMARY

Hence, the object of the invention is to propose a roof module which solves the problems of the known state of the art described above.

This object is attained by a roof module of the teaching of claim 1.

Advantageous embodiments of the invention are the subject matter of the dependent claims.

The roof module according to the invention for forming a vehicle roof of a motor vehicle comprises a panel component whose outer surface at least partially forms a roof skin of the vehicle roof, and an opening in which at least one environmental sensor is disposed, the environmental sensor being configured to send and/or receive electromagnetic signals for detecting the vehicle environment. The roof module is characterized in that the at least one environmental sensor is configured to be displaced between a retracted position and a deployed position, and that a set of weatherstrips surrounding the opening and comprising at least one drain is configured to collect liquid entering through the opening at the at least one drain.

In particular when the at least one environmental sensor is retracted or deployed, rain water or other humidity (liquid) can enter the opening of the roof module, for example. This liquid can be safely discharged at all times by the set of weatherstrips according to the invention, allowing an entry of liquid into the roof module (e.g., into a dry area in which the environmental sensor is disposed) or the roof space of the vehicle to be prevented. "At least one environmental sensor" means that the roof module can comprise one or more environmental sensors.

One advantage of this roof module according to the invention is a reliable and simple water management for the event that rain water or another liquid enters the opening in the roof module, for example. After all, this liquid can be discharged through the at least one drain. The circumferential set of weatherstrips, i.e., the set of weatherstrips disposed around the entire opening without interruption, i.e., continuously, allows entering liquid to be collected at the at least one drain in any even irrespective of its point of entry and to discharge it from the roof module from there. To this end, the set of weatherstrips has a geometry or shape which allows water to be channeled to the at least one drain in any event irrespective of its point of entry around the opening. The liquid can basically be discharged along any route in the vehicle (e.g., along the vehicle body); however, the route depends on where the environmental sensor is disposed in the roof module (with regard to the longitudinal direction and the width direction of the vehicle). For example, the water leaving the set of weatherstrips through the drain can be discharged laterally along what is known as the A-pillar of the vehicle. Generally speaking, the water can basically be discharged along the longitudinal direction, the width direction and/or the height direction of the vehicle. The drain (outlet) is preferably a rigid tubular connection piece which can be connected to one or more water draining channels provided on the body of the vehicle.

The roof module according to the invention can form a structural unit in which features for autonomous or semi-autonomous driving assisted by driver assistance systems are integrated and which can be attached on top of a vehicle shell as a unit by a vehicle manufacturer. Furthermore, the roof module according to the invention can be realized as an entirely solid roof or also as a roof having a roof opening system. Moreover, the roof module can be configured for use in a passenger vehicle or in a utility vehicle. The roof module can preferably be provided as a structural unit in the form of a roof sensor module (RSM), in which the environmental sensors are provided so as to be inserted into a roof frame of a vehicle body as a suppliable structural unit.

The environmental sensor of the sensor module of the roof module according to the invention can basically be configured in various ways and can in particular comprise a lidar sensor, a radar sensor, an optical sensor, such as a camera, and/or the like. For example, lidar sensors operate in a wavelength range of 905 nm or also of about 1550 nm. The material of the roof skin in the see-through area should be transparent to the wavelength range used by the environmental sensor and should therefore be selected as a function of the wavelength range(s) used by the environmental sensor.

In a preferred embodiment, the set of weatherstrips comprises at least one funnel-shaped portion ending in the drain for collecting the entering liquid. So in this embodiment, the set of weatherstrips preferably has a funnel-shaped or V-shaped area or portion in which the water entering through the opening accumulates irrespective of its point of entry around the opening. The area preferably conically tapers. The drain is provided at the pointed end of the funnel-shaped portion, allowing the water to be discharged at the mouth. The funnel-shaped design can in particular compensate for an inclined position of the vehicle at least along a longitudinal vehicle axis or along a vehicle width axis depending on whether the environmental sensor is disposed in the vehicle length direction or in the vehicle width direction. The funnel-shaped or V-shaped design of the portion preferably relates to a side view of the environmental sensor or, in other words, to a view in a plane oriented parallel to the optical axis of the environmental sensor and normal to the axis of rotation of the environmental sensor about which the environmental sensor rotates when it is retracted and/or deployed.

In a preferred embodiment, the set of weatherstrips comprises two drains disposed on the left and on the right of the environmental sensor, preferably mirror-symmetrically, when viewed in the direction of an optical axis of the environmental sensor. Furthermore, the set of weatherstrips of this embodiment comprises a funnel shaped portion both on the left and on the right of the environmental sensor when viewed in the direction of the optical axis of the environmental sensor for collecting the liquid circumferentially entering through the opening, each funnel-shaped portion ending in one of the two drains. This embodiment is particularly advantageous if the vehicle is (temporarily) positioned at an incline in the longitudinal vehicle direction and/or in the vehicle width direction, for example. In the exemplary case that the optical axis of the environmental sensor is oriented in the longitudinal vehicle direction (e.g., disposed on the front roof end portion of the roof module), water entering through the opening can be discharged either to the right or to the left (in the vehicle width direction) depending on how the vehicle is inclined relative to a horizontal.

In other words, in particular since the environmental sensor is disposed in the roof, it is preferred for two drains or outlets to be available (e.g., on the left and on the right of the environmental sensor when viewed in a longitudinal vehicle direction). In this way, water can be discharged via both drains, which has the advantage, in particular in the event that the vehicle is positioned at an incline (i.e., has an angle of inclination relative to a horizontal), that liquid collected by the set of weatherstrips can be continuously drained. During operation, the angle of inclination of a vehicle can reach 15° to 17°, for example, which means that it has to be ensured that water entering through the opening when the environmental sensor is moved into the deployed position, for example, can drain even in such an inclined position.

In a preferred embodiment, the set of weatherstrips comprises a first weatherstrip portion, which is disposed circumferentially around the opening und which is at least configured to seal the opening when the environmental sensor is in the retracted position by being in contact with a first mating weatherstrip portion of the environmental sensor and to seal the opening when the environmental sensor is in the deployed position by being in contact with a second mating weatherstrip portion of the environmental sensor. Particularly preferably, the first weatherstrip portion comprises a tubular weatherstrip disposed in an edge portion of the opening and preferably realized in one piece. So the first weatherstrip portion preferably forms what is referred to as a primary seal, which has the function of generally preventing the entry of humidity into the opening. Weatherstrips of this kind are also used in sunroofs or the like, for example. The first weatherstrip portion is plugged or glued onto an edge area around the opening, for example, or connected thereto in a liquid-tight manner in another way. The one-piece design of the first weatherstrip portion is advantageous since it ensures circumferential sealing along the entire outer circumference of the opening. Preferably, the tubular weatherstrip is annular or rectangular (depending on the cross section of the opening). The first weatherstrip portion is preferably configured to completely seal a gap constructively required between the environmental sensor and the installation space opening at least in the retracted and in the deployed state of the environmental sensor so that no humidity can enter the opening.

For example, the first mating weatherstrip portion is formed by a lid part of a housing surrounding the environmental sensor. More precisely, the first mating weatherstrip portion is preferably formed by the outer edge area of the plate-shaped lid part of the environmental sensor, which is preferably in liquid-tight contact with a sealing lip of the first weatherstrip portion circumferentially around the opening when the environmental sensor is in the retracted state. The lid part is preferably flush with the roof skin of the roof module, i.e., forms a plane surface therewith, when the environmental sensor is in the retracted state. The second mating weatherstrip portion can also be formed by a plurality of individual profiles each disposed on at least part of the housing (i.e., not necessarily around the entire circumference of the housing). The second mating weatherstrip portion is configured in such a manner that it is preferably in liquid-tight contact with a sealing lip of the first weatherstrip portion circumferentially around the opening when the environmental sensor is in the deployed state so that no humidity can enter the opening. The first weatherstrip portion and the first and second mating weatherstrip portions together form the first (primary) sealing barrier (main seal).

In a preferred embodiment, the environmental sensor comprises the housing, and the set of weatherstrips comprises a second weatherstrip portion, which extends in a flexibly movable manner between the first weatherstrip portion and the housing and on which the at least one drain is disposed. The second weatherstrip portion preferably forms a secondary sealing barrier, which prevents humidity from entering the opening even if the humidity has penetrated the first sealing barrier. This design has the advantage that, first, redundant sealing of the opening is made possible, which in particular increases the reliability of the sealing.

Second, the flexible movability of the second weatherstrip portion ensures uninterrupted sealing of the opening when the environmental sensor is being moved from the retracted state into the deployed state. After all, the second weatherstrip portion can ensure the seal even in the event that the first weatherstrip portion temporarily loses sealing contact with the first or the second mating weatherstrip portion at least partially (around the opening) during the retraction or deployment of the environmental sensor and water could therefore enter the opening in principle. By being disposed on one side of the housing of the environmental sensor, the second weatherstrip portion can flexibly move with the environmental sensor, preventing a loss of sealing contact.

Preferably, the second weatherstrip portion is essentially sack-shaped and continuously surrounds the opening along its entire circumference. So the second weatherstrip portion forms a kind of wet area which entirely surrounds the opening. So the second weatherstrip portion forms a water-discharging collar around the opening in the roof module. The second weatherstrip portion preferably has the shape of an annular collar-shaped sack or a groove. The phrasing "essentially sack-shaped" means that the second weatherstrip portion is preferably open at the top (in the roof direction), which allows water entering the opening to flow into the sack-shaped weatherstrip portion.

In a preferred embodiment, the second weatherstrip portion is made of a flexible, mat-shaped material, preferably rubber or a liquid-tight textile. The second weatherstrip portion can also be a kind of bellows, which allows the flexible movability to be ensured. A collar made of ethylene propylene diene rubber (EPDM) is also possible. On the part of the material, in particular the liquid tightness and the flexible movability of the material are advantageous.

Particularly preferably, the second weatherstrip portion has the shape of a waterskin, thereby forming a secondary seal between the roof skin and the sensor module. The second weatherstrip portion preferably forms a secondary separating plane between an outer circumference of the opening and the housing of the sensor, preventing humidity from entering the opening and forming a barrier against wind and other environmental conditions during the movement (retraction and deployment of the environmental sensor).

In a preferred embodiment, the second weatherstrip portion at least partially forms the at least one funnel-shaped weatherstrip portion ending in the drain for collecting the entering liquid. So the second weatherstrip portion is funnel-shaped or V-shaped at least at one of the side portions of the opening when viewing said side from the top. At its lower end (in the direction of the bottom), the funnel-shaped or V-shaped portion of the second weatherstrip portion has the drain through which the water entering the second weatherstrip portion can drain. So the second weatherstrip portion preferably has a funnel-shaped or V-shaped depression in the waterskin otherwise realized as a collar. Preferably, the waterskin has funnel-shaped or V-shaped depressions on both sides when viewed in the direction along the optical axis of the environmental sensor. At this point, reference is made to the above description of the set of weatherstrips. In this way, the second weatherstrip portion forms a type of channel extending around the opening. The channel preferably has a V-shaped depression on at least one of the side portions of the environmental sensor that are oriented parallel to the optical axis of the sensor, a depth of the channel changing, preferably conically centrally tapering toward a deepest point, in said V-shaped depression when viewed from the side. The drain is disposed at the deepest point.

In a preferred embodiment, the second weatherstrip portion is connected to an edge portion of the first weatherstrip portion in a liquid-tight manner along a first edge area. Particularly preferably, the second weatherstrip portion is connected to the edge portion of the first weatherstrip portion in a liquid tight manner along the first edge area via a plug connection, a welded connection or a glued connection. The first edge area of the first weatherstrip portion is preferably a type of sealing lip or, alternatively, an additional tubular weatherstrip to which the second weatherstrip portion can be attached along the first edge area. So the first edge area of the second weatherstrip portion can be connected to the edge portion of the first weatherstrip portion either in a reversible, detachable manner by means of a plug connection or be welded or glued thereto non-reversibly or be permanently connected thereto in a liquid tight manner in another way. For example, a connection by VHF welding is possible. Particularly preferably, the first edge area of the second weatherstrip portion comprises a plug profile, such as a U-shaped (preferably flexible) plug rail which can be plugged onto a corresponding sealing lip of the first weatherstrip portion. In other words, according to the invention, the same primary sealing (by means of the first weatherstrip portion) as in the case of a retracted environmental sensor can be used. An additional sealing lip against which the plug profile pushes is installed in addition to the first weatherstrip portion preferably realized as a tubular weatherstrip.

Regarding installation, this embodiment has the advantage that the roof module or the opening can be retrofitted with the environmental sensor and the second weatherstrip portion can be attached to the first weatherstrip portion of the roof module thereafter. The plug profile is preferably configured to correspond to the edge portion of the first weatherstrip portion in such a manner that plugging results in a tight connection which does not loosen even if the second weatherstrip portion is filled with water (e.g., if the waterskin is completely filled). A plug profile of this kind or a plug profile rail of this kind can be made of plastic and/or rubber including reinforcing metal inserts and is preferably permanently connected, e.g., welded or glued, to the mat-shaped edge of the second weatherstrip portion. This embodiment enables installation from the outside and the inside of the vehicle.

In a preferred embodiment, the second weatherstrip portion is connected to the housing of the environmental sensor in a liquid-tight manner along a second edge area of the second weatherstrip portion. Particularly preferably, the second weatherstrip portion is connected to the housing in a liquid-tight manner along the second edge area via a plug connection, a welded connection or a glued connection. The first edge area of the second weatherstrip portion essentially extends along or in correspondence with an outer circumference of the opening. So the second edge area of the second weatherstrip portion, which is located opposite the first edge area, is disposed on the housing of the environmental sensor to form the three-dimensional collar surrounding the opening. For attaching the second edge area, at least one profile portion preferably provided with sealing lips or other weatherstrips at each end is preferably disposed on the housing or on parts of the housing so as to seal the wet area formed by the second weatherstrip portion in the installed state off from the housing or the environmental sensor in a liquid-tight manner. The profile portion can be hook-shaped or essentially S-shaped, for example, and preferably circumferentially protrude from the housing. The profile portion can be made of plastic, metal or polycarbonate, for example. A plug connection is also advantageous installation-wise for attaching the second edge area of the second weatherstrip portion, wherein such a plug connection can basically be realized similar to the above.

For example, the housing can comprise multiple housing portions, i.e., does not have to be purely box-shaped; instead, it can additionally comprise a lid portion and/or a connecting portion by means of which the housing is supported on a frame structure of the roof module in such a manner that it can rotate about the axis of rotation of the environmental sensor.

In a preferred embodiment, the second weatherstrip portion defines a wet area of the roof module surrounding the opening and forms a barrier separating the wet area from a dry area of the roof module in which the environmental sensor is disposed. This embodiment highlights in particular that the existence of the second weatherstrip portion can ensure a preferably hermetic sealing off of the dry area from the wet area. This separation into a wet area and a dry area allows, for example, mechanisms required for the displacement of the environmental sensor, other electrical connections (such as plugs) and the environmental sensor on the whole including its housing to be disposed in the dry area, in which there is no contact with humidity. In this way, it is possible to dispense with otherwise needed through holes through a sealing plane (e.g., for connecting a drive device of the environmental sensor) since all cables and other humidity-sensitive components can be entirely disposed in the dry area. This avoids certain issues and reduces the failure rate. Likewise, expensive and more complex sealing classes (IP classes) otherwise required in a humid environment are no longer necessary.

In a preferred embodiment, the second mating weatherstrip portion comprises at least one profile portion which is disposed on the environmental sensor or on the housing of the environmental sensor. Preferably, the profile section is disposed circumferentially around the housing of the environmental sensor and at least partially protrudes therefrom. The profile portion preferably serves to tightly connect the second edge area of the second weatherstrip portion to the housing of the environmental sensor in a liquid-tight manner.

In a preferred embodiment, the at least one profile portion is at least partially shaped in such a manner that there is a preferably constant sealing contact between the first weatherstrip portion and the second mating weatherstrip portion while the environmental sensor is being moved from the retracted position into the deployed position. This at least partial design of the profile portion ensures that the sealing contact with the primary seal (between the first weatherstrip portion and the housing of the environmental sensor) will not be lost at least around a part of the opening even when the environmental sensor is moving about its axis of rotation. The profile portion is preferably designed in this manner in an edge area of the opening extending parallel to the axis of rotation of the environmental sensor. The design can be achieved, for example, if the profile portion has a concave, curved shape which faces away from the housing and whose curvature can be derived from the normal distance from the axis of rotation of the environmental sensor. In other words, it is preferred for the sealing contact with the primary seal laterally and in the area around the opening extending parallel to the axis of rotation of the environmental sensor is not lost while the environmental sensor is being retracted and deployed. This is possible in particular since the environmental sensor merely rotates about its own axis of rotation.

Of course, the roof module can also comprise more than one opening, more than one environmental sensor and more than one set of weatherstrips (at least one per opening and one per environmental sensor) without leaving the scope of the present invention.

Of course, the embodiments described above and the examples of embodiments described below can be used both individually and in any combination with each other without leaving the scope of the present invention.

BRIEF DESCRIPTIONS OF THE DRAWINGS

An embodiment of the invention is schematically illustrated in the drawing and will be explained as an example below.

DETAILED DESCRIPTION

Figure 1:
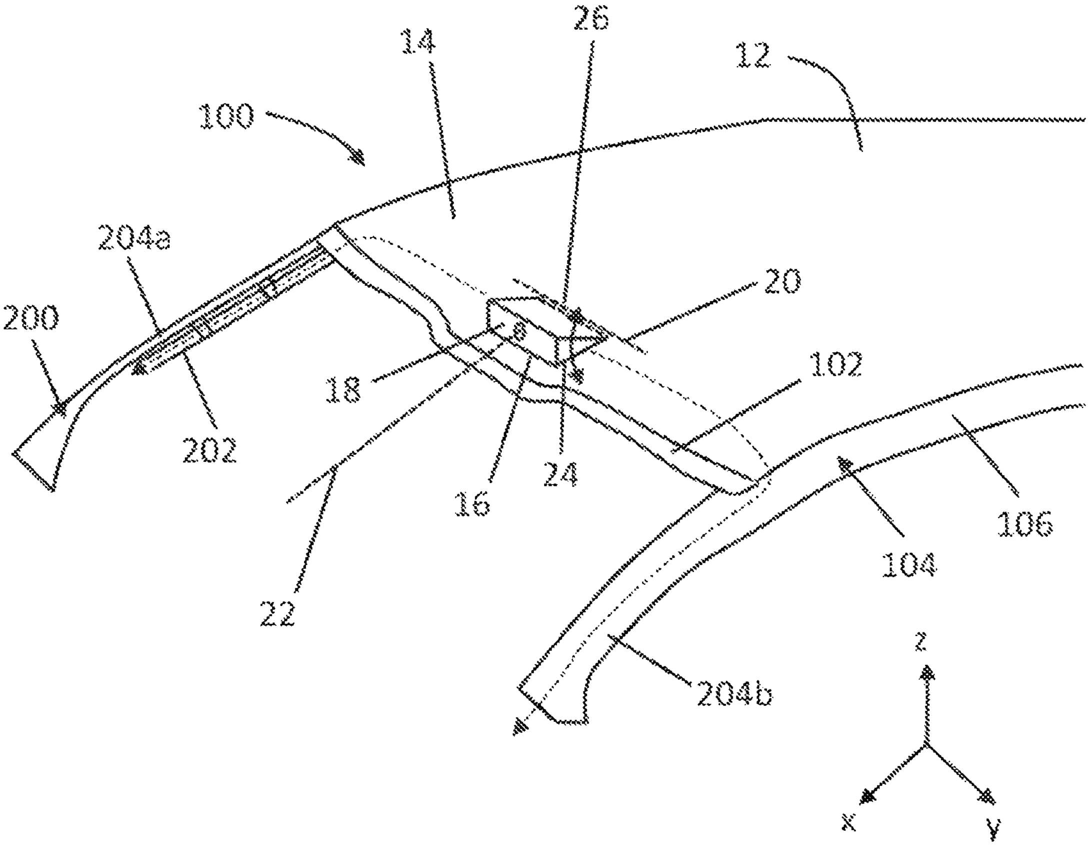
FIG. 1 is a schematic view of a roof module according to the invention installed on a vehicle roof.

FIG. 1 shows a vehicle roof 100 comprising a roof module 10. Roof module 10 comprises a panel component 12 for forming a roof skin 14 of vehicle roof 100 of a vehicle (not fully shown). An opening 16 in which an environmental sensor 18 is disposed is located in a front central roof portion of vehicle roof 100 or roof module 10 when viewed in a longitudinal vehicle direction x. Opening 16 and environmental sensor 18 are disposed centrally (in vehicle width direction x) directly behind a front transverse beam 102 defining a front header of vehicle roof 100.

Roof module 10 is inserted as a structural unit into a roof frame 104 of a vehicle body 200 und has a frame structure itself which ensures the installation of roof module 10 on roof frame 104. Roof frame 104 is formed by at least two of transverse beams 102 (front and rear) and by at least two longitudinal beams 106 extending in longitudinal vehicle direction x. In other embodiments, roof module 10 can also be realized as a panoramic roof with a see-through opening for the passenger compartment, for example.

Environmental sensor 18 (which may be a lidar sensor) can be displaced between a retracted position und a deployed position by rotating about an axis of rotation 20 of environmental sensor 18. In FIG. 1, environmental sensor 18 is illustrated in the deployed position. The displaceability of environmental sensor 18 from the retracted position into the deployed position and vice-versa is preferably provided by means of an electric drive (not shown).

Environmental sensor 18 is configured, for example, to detect a vehicle environment around the vehicle by means of an evaluation and control unit using electromagnetic signals. To this end, environmental sensor 18 is configured to send and/or receive in a field of view of environmental sensor 18 which extends conically around an optical axis 22 of environmental sensor 18.

To prevent (rain) water from entering opening 16, which could cause damage to environmental sensor 18 and/or other electrical components and in the interior of the vehicle, roof module 10 according to the invention has a set of weatherstrips 24. When environmental sensor 18 is retracted and/or deployed, the rotation about axis of rotation 20 of environmental sensor 18 could allow water to enter between environmental sensor 18 and opening 16 (i.e., in an edge area). In order for said entering water to be discharged, the set of weatherstrips 24 is configured to collect the water entering through opening 16 in such a manner that it can preferably be discharged or drained from the vehicle on the right and on the left (in relation to longitudinal vehicle direction x) via draining channels 202 provided in beams 204*a* and 204*b* of vehicle body 200. This water drainage is indicated in FIG. 1 by two dashed arrows running along beams 204*a* and 204*b*, one of draining channels 202 being covered by beam 204*b*. Beams 204*a* and 204*b* can be A-pillars of the vehicle, for example, or also B-, C- or D-pillars in other configurations.

Figure 8:
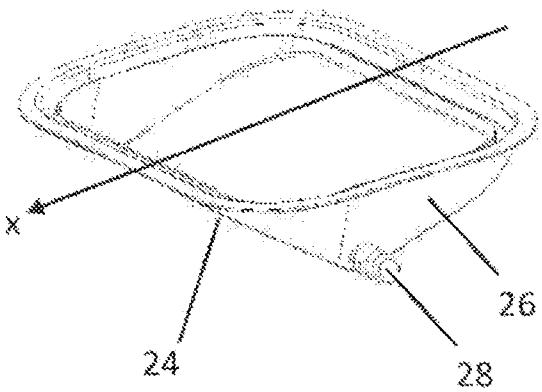
FIG. 8 is a perspective view of a set of weatherstrips according to the invention.

For collecting the water which can enter around opening 16, the set of weatherstrips 24 comprises at least one funnel-shaped portion 26 ending in a drain 28 at its conically tapering end (see FIG. 8). In FIG. 8, the set of weatherstrips 24 is only shown schematically in simplified form, in which funnel-shaped portion 26 is clearly visible, however. According to FIG. 8, funnel-shaped portion 26 extends parallel to longitudinal vehicle direction x on both sides (on the right and on the left of environmental sensor 18) if environmental sensor 18 is disposed in a front area of the vehicle and its optical axis 22 is oriented in longitudinal vehicle direction x. If environmental sensor 18 is disposed sideways, i.e., optical axis 22 of environmental sensor 18 is oriented along vehicle width direction y, the at least one funnel-shaped portion 26 is preferably oriented parallel to vehicle width direction y.

Figure 2:
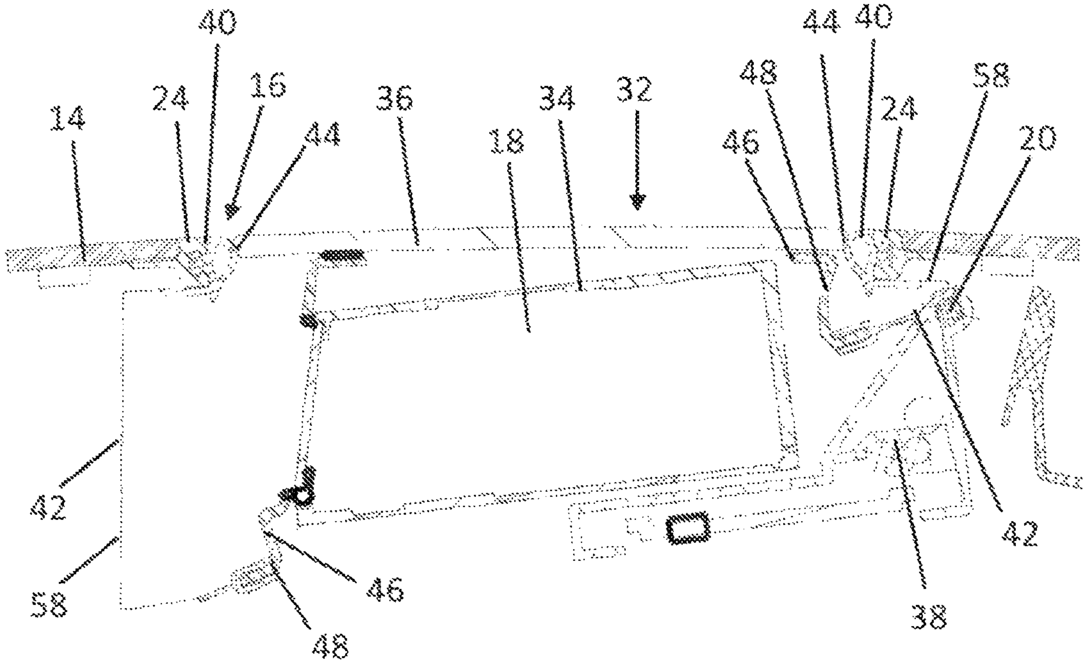
FIG. 2 is a section view along a longitudinal vehicle direction showing an environmental sensor in a retracted state.
Figure 3:
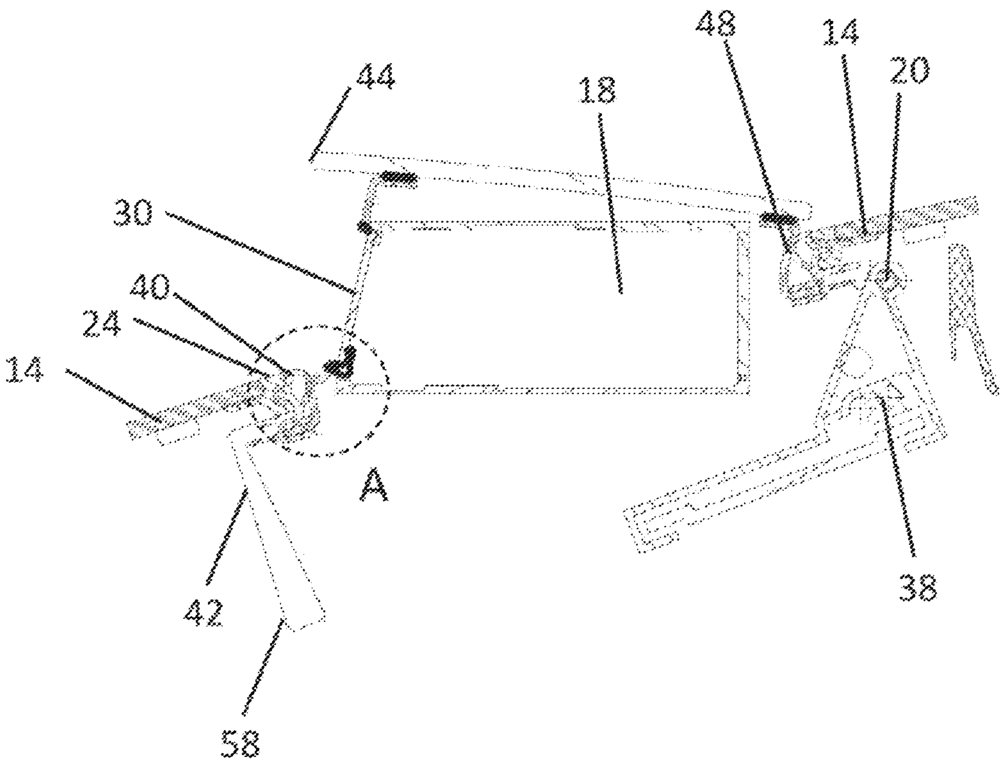
FIG. 3 is a section view along a longitudinal vehicle direction showing an environmental sensor in a deployed state.

FIG. 2 shows a section view of a part of the roof module 10 which extends parallel to the longitudinal vehicle direction (y=0 cut). Environmental sensor 18 is illustrated in the retracted position in this section view. FIG. 3 shows a similar section view, in which environmental sensor 18 is illustrated in the deployed position, however, in which a see-through portion 30 of environmental sensor 18 protrudes beyond roof skin 14 and environmental sensor 18 can sense, i.e., detect, the vehicle environment. See-through portion 30 is configured in such a manner that it is transparent to the wavelength ranges used by environmental sensor 18.

Environmental sensor 18 comprises a housing 32 having a sensor housing 34, in which environmental sensor 18 is disposed, and a lid part 36. Lid part 36 of housing 32 is attached to housing 32 of environmental sensor 18 via one or more profiles. When environmental sensor 18 is in the retracted position, lid part 36 is flush with roof skin 14. By means of housing 32 or by means of profiles attached to housing 32, environmental sensor 18 is mounted on a support structure 38 of roof module 10 in such a manner that environmental sensor 18 can rotate about axis of rotation 20.

The set of weatherstrips 24 surrounding opening 16 has a first weatherstrip portion 40 and a second weatherstrip portion 42. First weatherstrip portion 40 is a tubular weatherstrip. The tubular weatherstrip is plugged onto an edge area surrounding opening 16 in roof skin 14 (see detail view in FIG. 4). First weatherstrip portion 40 serves as a primary sealing barrier for sealing a constructively required gap between opening 16 and housing 32 of environmental sensor 18.

Figure 7:
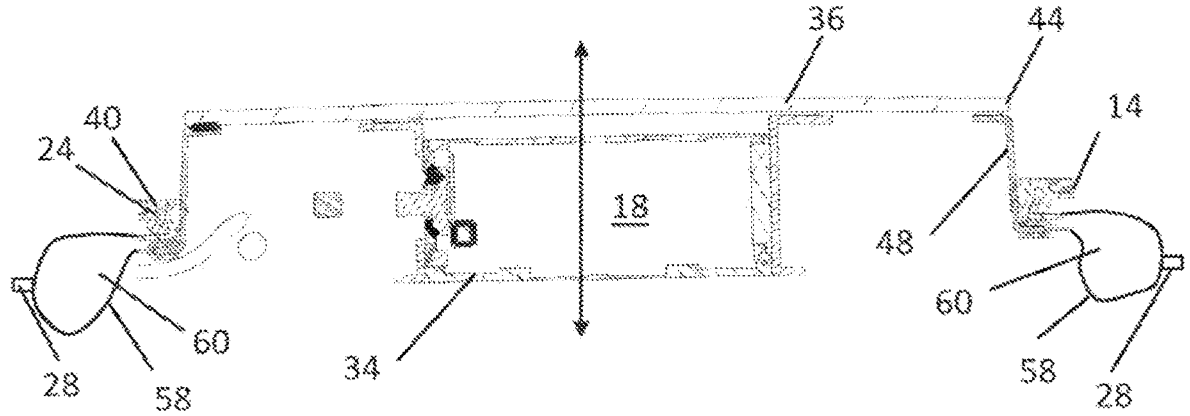
FIG. 7 is a section view along a vehicle width direction showing an environmental sensor in a retracted state.

The first weatherstrip portion 40 is configured to seal opening 16 when environmental sensor 18 is in the retracted position (see FIG. 2) by being in contact (i.e., at least one sealing lip of the tubular weatherstrip being in contact) with a first mating weatherstrip portion 44 of environmental sensor 18, and to seal opening 16 when environmental sensor 18 is in the deployed position (see FIGS. 3 und 4) by being in contact (i.e., by at least one sealing lip of the tubular weatherstrip being in contact) with a second mating weatherstrip portion 46 of environmental sensor 18. First mating weatherstrip portion 44 is formed by an edge surrounding lid part 36. Second mating weatherstrip portion 46 is formed by a profile portion 48 preferably circumferentially disposed on sensor housing 34 of environmental sensor 18. The geometrical design of profile portion 48 can vary along the circumference of sensor housing 34. For example, the at least one profile portion 48 can be shaped in such a manner in a sensor housing area extending parallel to axis of rotation 20 of environmental sensor 18 that there is constant sealing contact between first weatherstrip portion 40 and second mating weatherstrip portion 46, i.e., profile portion 48, in this area while environmental sensor 18 is being displaced from the retracted position into the deployed position. To this end, profile portion 48 can be partially concave (in the direction away from sensor housing 34), as is visible in the section views of FIGS. 2 and 3. In the lateral areas of sensor housing 34 (parallel to optical axis 22 of environmental sensor 18), profile portion 48 can shaped in such a manner that it forms an acute angle relative to sensor housing 34 (to a vertical), thus ensuring that the sealing contact between first weatherstrip portion 40 and second mating weatherstrip portion 46 is preferably not lost in said lateral areas during the retraction and the deployment of environmental sensor 18 (see FIG. 7).

Figure 4:
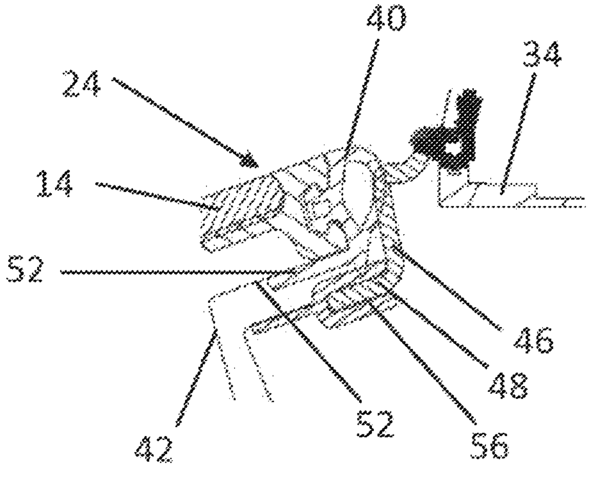
FIG. 4 is a detail view of part of the illustration shown in FIG. 3.
Figure 5:
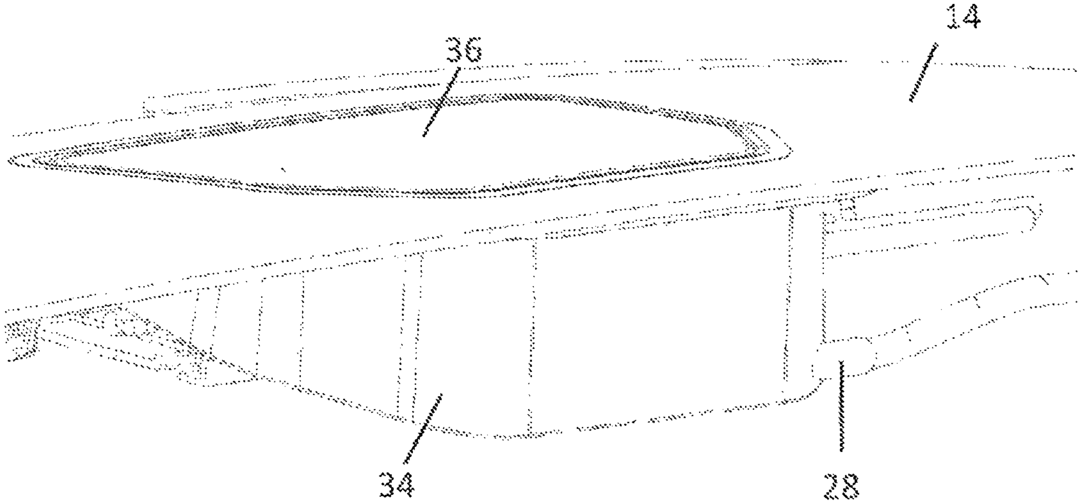
FIG. 5 is a perspective view of part of a roof module according to the invention.

The second weatherstrip portion 42 is connected to an edge portion 52 of first weatherstrip portion 40 in a liquid-tight manner along a first edge area 50 of second weatherstrip portion 42 (see in particular detail view of FIG. 4). Edge portion 52 is preferably realized as a sealing lip. Second weatherstrip portion 42 is permanently connected (e.g., welded) to edge portion 52 via its first edge area 50. Alternatively, a plug connection or a glued connection can be used. Second weatherstrip portion 42 is connected to housing 32, more precisely to profile portion 48, which is disposed on housing 32, in a liquid-tight manner along a second edge area 54 of second weatherstrip portion 42. In the example at hand, second weatherstrip portion 42 is tightly plugged onto profile portion 48 in a liquid-tight manner by means of a plug connection 56. Welding, gluing or another type of connection is possible in the alternative. Second weatherstrip portion 42 is made of a flexible, mat-shaped material, preferably rubber or a liquid-tight textile, and realized in the shape of a waterskin 58 in the example at hand. Waterskin 58 surrounds opening 16 as a self-contained barrier or collar. Second weatherstrip portion 42 at least partially forms the at least one funnel-shaped portion 26 ending in drain 28 for collecting the entering liquid. In the example at hand, second weatherstrip portion 42 forms funnel-shaped portion 26 both on the right and on the left (when viewed in longitudinal vehicle direction x), each funnel-shaped portion 26 ending in drain 28 (see FIG. 7).

Figure 6:
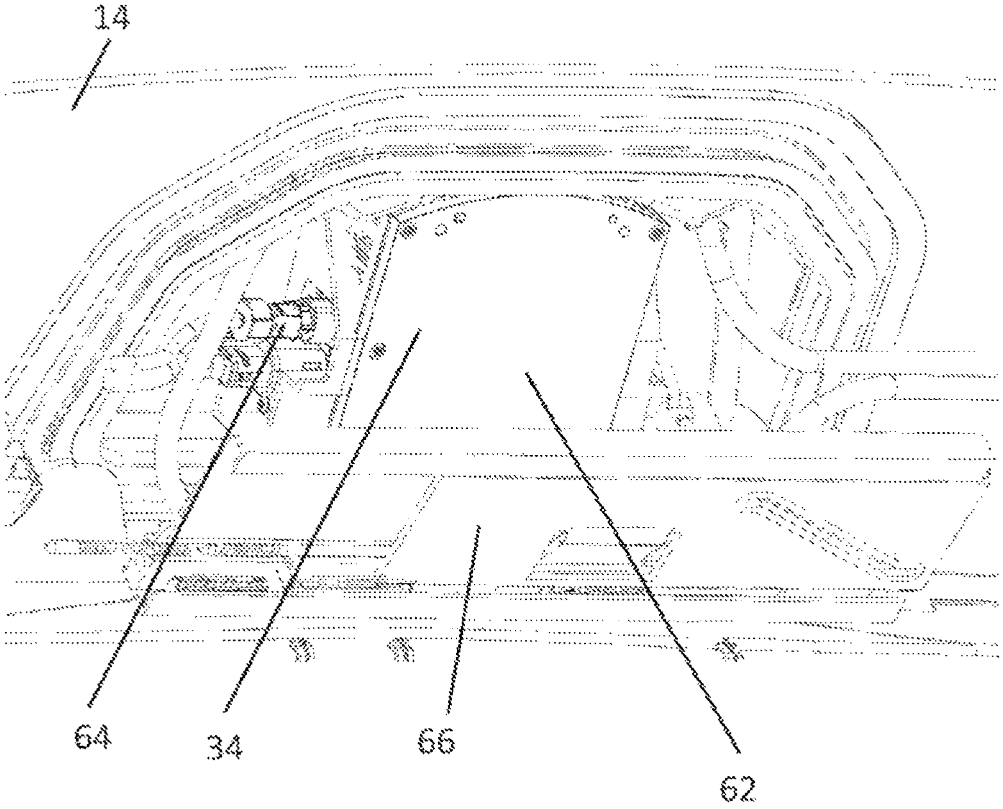
FIG. 6 is a bottom view of part of a roof module according to the invention.

The self-contained collar of second weatherstrip portion 42, which is realized as waterskin 58, defines a secondary sealing barrier, which prevents liquid from entering the interior of roof module 10 where environmental sensor 18 is disposed even if the primary sealing barrier (first weatherstrip portion 40) fails. Thus, second weatherstrip portion 42 defines a wet area 60 of roof module 10 surrounding opening 16 and acts as a barrier separating wet area 60 from a dry area 62 of roof module 10, in which environmental sensor 18 is disposed. Electrical connections 64 of environmental sensor 18 (see bottom view of FIG. 6) are also disposed in said dry area 62, for example. It is noted that wet area 60 formed by second weatherstrip portion 42 is not illustrated in FIG. 6 for the sake of clarity. So the bottom of roof module 10 is seen from an interior of the vehicle. Displacement kinematics 66 of environmental sensor 18 not described in more detail are also disposed in dry area 62.

The invention claimed is:

1. A roof module for forming a vehicle roof of a motor vehicle, the roof module comprising:

a panel component whose outer surface at least partially forms a roof skin of the vehicle roof, and an opening in which at least one environmental sensor is disposed, the environmental sensor being configured to send and/or receive electromagnetic signals for detecting the vehicle environment, wherein the at least one environmental sensor is configured to be displaced between a retracted position and a deployed position, and that a set of weatherstrips surrounding the opening and comprising at least one drain is configured to collect liquid entering through the opening at the at least one drain, wherein the set of weatherstrips comprises at least one funnel-shaped portion ending in the drain for collecting the entering liquid, and wherein the set of weatherstrips comprises two drains which are disposed on the right and on the left of the at least one environmental sensor when viewed in the direction of an optical axis of the at least one environmental sensor, and that the set of weatherstrips comprises a funnel-shaped portion both on the right and on the left of the at least one environmental sensor when viewed in the direction of the optical axis of the at least one environmental sensor for collecting the liquid circumferentially entering through the opening, each funnel-shaped portion ending in one of the two drains.

2. The roof module according to claim 1, wherein the set of weatherstrips comprises a first weatherstrip portion which is disposed along the circumference of the opening and at least configured to seal the opening when the at least one environmental sensor is in the retracted position by being in contact with a first mating weatherstrip portion of the at least one environmental sensor and to seal the opening when the at least one environmental sensor is in the deployed position by being in contact with a second mating weatherstrip portion of the at least one environmental sensor.

3. The roof module according to claim 2, wherein the first weatherstrip portion comprises a tubular weatherstrip disposed in an edge area of the opening and realized in one piece.

4. The roof module according to claim 1, wherein the at least one environmental sensor comprises a sensor housing, and the set of weatherstrips comprises a second weatherstrip portion which extends in a flexibly movable manner between the first weatherstrip portion and the housing and on which the at least one drain is disposed.

5. The roof module according to claim 4, wherein the second weatherstrip portion surrounds the opening.

6. The roof module according to claim 4, wherein the second weatherstrip portion is made of a flexible, mat-shaped material of rubber or a liquid-tight textile.

7. The roof module according to claim 4, wherein the second weatherstrip portion has the shape of a waterskin.

8. The roof module according to claim 1, wherein the second weatherstrip portion partially forms the at least one funnel-shaped portion ending in the drain for collecting the entering liquid.

9. The roof module according to claim 1, wherein the second weatherstrip portion is connected to an edge portion of the first weatherstrip portion in a liquid-tight manner along a first edge area.

10. The roof module according to claim 9, wherein the second weatherstrip portion is connected to the first edge portion of the first weatherstrip portion in a liquid-tight manner along the first edge area via a plug connection, a welded connection or a glued connection.

11. The roof module according to claim 1, wherein the second weatherstrip portion is connected to the housing of the at least one environmental sensor in a liquid-tight manner along a second edge area of the second weatherstrip portion.

12. The roof module according to claim 11, wherein the second weatherstrip portion is connected to the housing along the second edge area in a liquid-tight manner via a plug connection, a welded connection or a glued connection.

13. The roof module according to claim 1, wherein the second weatherstrip portion defines a wet area of the roof module, the wet area surrounding the opening, and forms a barrier separating the wet area from a dry area of the roof module in which the at least one environmental sensor is disposed.

14. The roof module according to claim 2, wherein the second mating weatherstrip portion comprises at least one profile portion disposed on the at least one environmental sensor.

15. The roof module according to claim 14, at least part of the at least one profile portion is shaped in such a manner that a constant sealing contact exists between the first weatherstrip portion and the second mating weatherstrip portion while the at least one environmental sensor is being displaced from the retracted position into the deployed position.

16. The roof module according to claim 1, wherein the at least one environmental sensor can be turned between the retracted position and the deployed position about an axis of rotation.

17. The roof module according to claim 1, wherein the at least one environmental sensor is a lidar sensor and/or a radar sensor and/or a camera sensor and/or a multi-camera sensor.

18. A motor vehicle comprising a roof module according to claim 1.

* * * * *